United States Patent [19]
Holtz et al.

[11] Patent Number: 4,813,066
[45] Date of Patent: Mar. 14, 1989

[54] BATTERY FEED CIRCUIT FOR A TELEPHONE SYSTEM

[75] Inventors: Roger E. Holtz; Thomas A. Stahl, both of Indianapolis, Ind.

[73] Assignee: American Telephone and Telegraph Company, AT&T Information Systems, Holmdel, N.J.

[21] Appl. No.: 72,322

[22] Filed: Jul. 13, 1987

[51] Int. Cl.$^4$ .................. H04M 3/00; H04M 19/02
[52] U.S. Cl. .................................. 379/413; 379/165; 370/27
[58] Field of Search ............... 379/156, 157, 158, 160, 379/159, 161, 162, 163, 164, 165, 166, 338, 340, 339, 348, 324, 399, 405, 413; 370/28, 27, 26, 29

[56] References Cited

U.S. PATENT DOCUMENTS

| | | | |
|---|---|---|---|
| 3,497,619 | 10/1967 | Babcock | 178/68 |
| 3,993,880 | 11/1976 | O'Neill | 379/377 |
| 4,087,647 | 5/1978 | Embree et al. | 379/413 |
| 4,363,936 | 12/1982 | Christian et al. | 379/165 X |
| 4,393,494 | 7/1983 | Belforte et al. | 370/27 |
| 4,432,089 | 2/1984 | Wurzburg et al. | 379/339 X |
| 4,598,396 | 7/1986 | Upp et al. | 370/27 |

*Primary Examiner*—Jin F. Ng
*Assistant Examiner*—Randall S. Vaas
*Attorney, Agent, or Firm*—Michael A. Morra

[57] ABSTRACT

An arrangement is disclosed for delivering DC power (battery), voice, and data signals from a telephone controller to a telephone station over first and second wire-pairs. Minimum interference between these signals is achieved when the first wire-pair is used as the voice signal path and the second wire-pair is used as the data signal path. DC power is fed out of the controller and into the center tap of an audio transformer interconnected with the first wire-pair. Ground current is returned to the controller through a balanced resistive circuit interconnected with the second wire-pair.

13 Claims, 4 Drawing Sheets

4,813,066

BATTERY FEED CIRCUIT FOR A TELEPHONE SYSTEM

FIELD OF THE INVENTION

The present invention relates to telephone systems having a controller and one or more stations; and more particularly to a system in which the controller supplies DC power to, and exchanges voice and data signals with, each station.

BACKGROUND OF THE INVENTION

In business communication systems, a number of telephone stations are individually connected to a single controller which, in turn, connects to a telephone switching office. Such controllers have the job of supplying DC power to, and exchanging voice and data signals with, each telephone station in an efficient manner. It is desirable in these systems to minimize the number of wires between each station and the controller while keeping the voice and data signals from interfering with each other. Such needs, however, are frequently incompatible, and certain systems use up to four wire-pairs to achieve minimum interference between the signals.

In one well known technique, both voice signals and DC power are transmitted over a single wire-pair that is transformer coupled to the controler at one end of the wire-pair and to the telephone station at the other. A capacitor is placed in series with a pair of the transformer's secondary windings that interconnect with the wire-pair so that DC power will flow toward the station over one conductor of the wire-pair and return to the controller over the other. It is in this manner that standard telephone sets receive voice signals and DC power. However, DC power variations are not necessarily correlated with the voice signal, and since this particular technique causes the DC power to flow in the same direction through each secondary winding, the flux created in these windings additively combines. Power variations therefore create signals on the wire-pair, unrelated to the voice signal, that interfere with voice communication. Such signals are deemed to be "noise." One way to eliminate this noise is to use a current source; however, this adds cost to the station and places an unnecessary burden on the power supply in the controller.

It is therefore an object of this invention to provide an arrangement for delivering power and exchanging voice and data signals between a controller and a telephone station in a manner that minimizes mutual interference.

It is another object of the present invention to allow DC signaling in order to minimize the complexity of data transmitting and receiving circuitry.

It is yet another object of the present invention to minimize the number of wires between the controller and each telephone station needed in the distribution of power, voice, and data signals.

SUMMARY OF THE INVENTION

A novel Battery Feed Circuit for a Telephone System uses a 4-wire connection between a controller and a telephone station to deliver power and to exchange data and voice signals. Crosstalk between data and voice is minimized by the low data signaling levels used. Such signaling is made possible by the particular manner in which DC power is delivered to, and returned from, the telephone station. At the controller, the secondary winding of a balanced audio transformer is connected to a first wire-pair. A DC voltage source is connected to the center tap of the secondary winding for the delivery of DC power to the telephone station. Each conductor of the first wire-pair carries an equal amount of DC current, in the same direction, between the controller and the telephone station. At the telephone station, the secondary winding of a balanced audio transformer is connected to the first wire-pair. The center tap of that secondary winding interconnects to power conditioning apparatus. The primary windings of these various audio transformers are used for coupling voice signals to and from the first wire-pair.

A second wire-pair, resistively terminated at the controller and at the telephone station, is used as a return path for DC power. Each resistive termination comprises a pair of substantially equal resistors connected in series between conductors of the second wire-pair. DC power is returned to the controller via the common connection between each resistor pair. Additionally, bidirectional DC signaling is enabled over the second wire-pair using a DC signal transmitter and a DC signal receiver at each end.

BRIEF DESCRIPTION OF THE DRAWING

The invention and its mode of operation will be more clearly understood from the following detailed description when read with the appended drawings in which.

DETAILED DESCRIPTION

Figure 2:
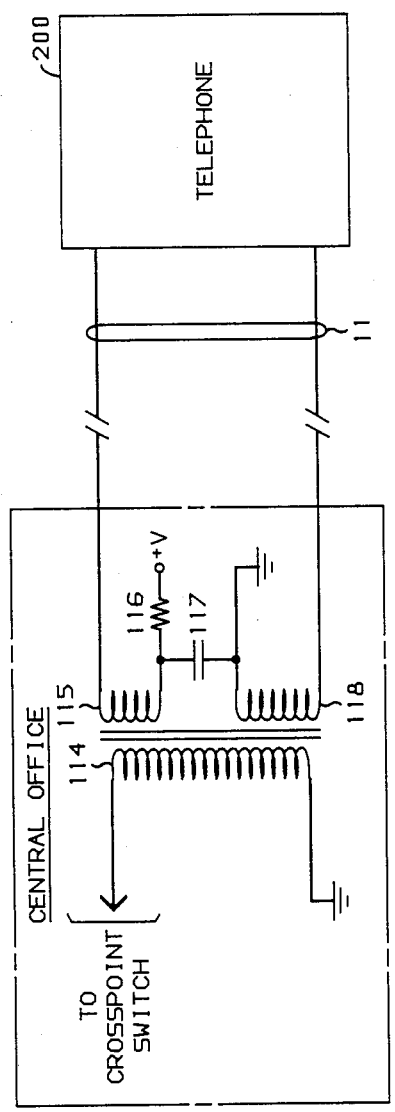
FIG. 2 illustrates a prior art battery feed and voice communication circuit.

FIG. 2 discloses one prior art technique for powering telephone circuits such as performed in a telephone Central Office. In this circuit, an audio transformer is used to couple voice signals to wire-pair 11 which interconnects the Central Office with telephone 200. The transformer comprises primary winding 114 and secondary windings 115, 118. The secondary windings are interconnected by capacitor 117 which controls the flow of AC and DC currents on wire-pair 11. A voltage source, designated +V is applied to secondary winding 115 through current limiting resistor 116 to provide DC power to telephone 200. A problem with this technique is that fluctuations in DC current being drawn by telephone 200 show up as audio signals. Since electrical current flows in the same direction of the secondary windings 115, 118 the flux created in each winding adds. This results in audible interference on primary winding 114. If the electrical current fluctuations are related to the audio signal, no problem is created. However, if the fluctuations are related to other signals, as is the case with data, then they are noise.

Figure 1:
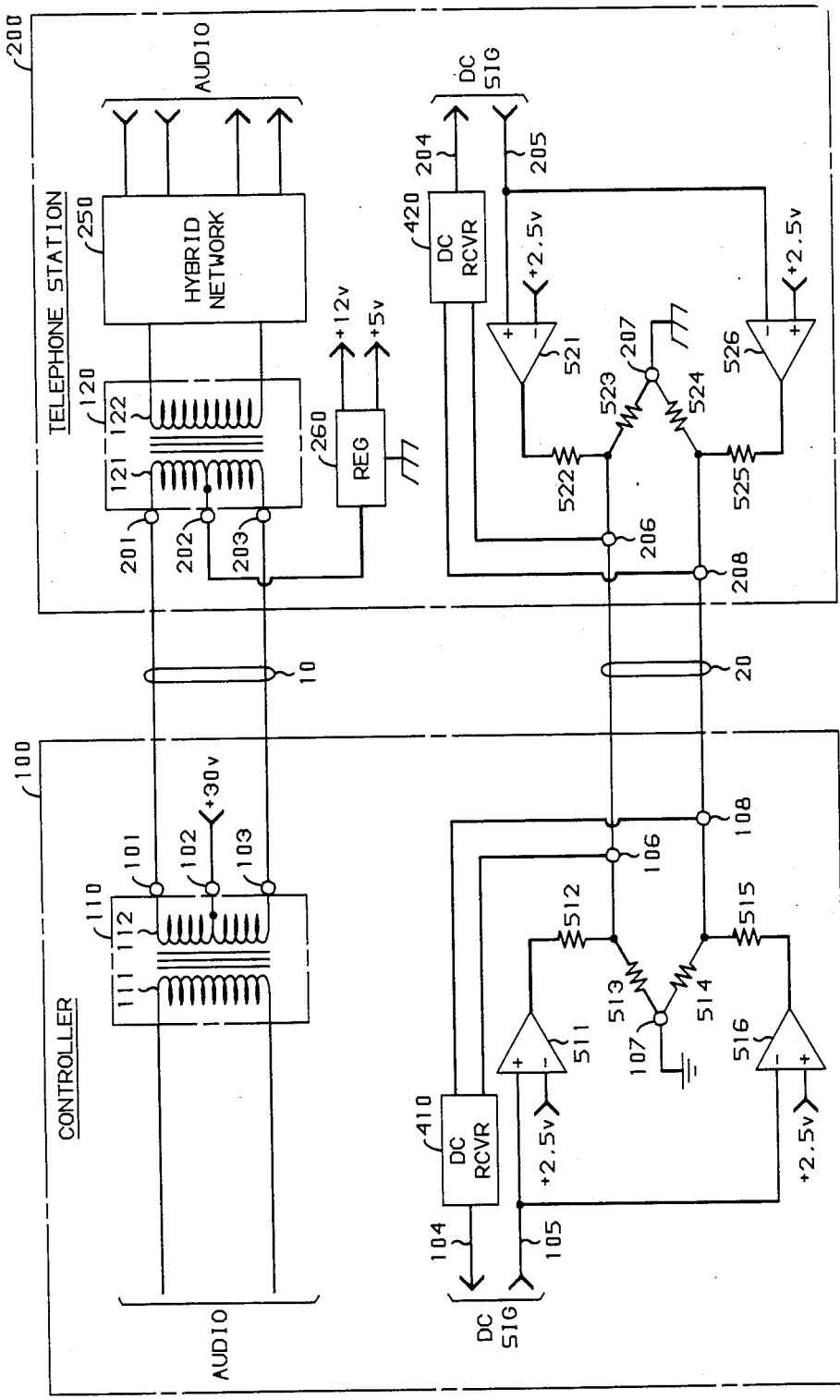
FIG. 1 shows a Battery Feed Circuit for a Telephone System in accordance with the invention.

The present invention, shown in FIG. 1, uses a phantom powering scheme in connection with wire-pair 10, used for audio signal transmission, and wire-pair 20 used for DC signal transmission. In this scheme, the electrical currents due to power fluctuations, flow in opposite directions in each half of the secondary windings 112, 121 connected to wire-pair 10. Since these windings are balanced, the flux created by the two currents will cancel, thereby resulting in an induced voltage of zero at primary windings 111 and 122.

A +30 volt source of DC power (battery feed) is shown connected to center tap 102 of secondary winding 112 of transformer 110. The battery feed voltage is delivered to telephone station 200 at center tap 202 of secondary winding 121 of transformer 120. Voltage regulator 260 converts the received battery feed voltage into +12 volt an +5 volt sources that are filtered and regulated for use within telephone station 200. In addition to delivering battery feed voltage, wire-pair 10 also carries audio signals in two directions. Hybrid network 250 performs 2-wire to 4-wire conversion and 4-wire to 2-wire conversion using well-known, conventional techniques. Wire-pair 20 provides a return path for the battery feed voltage between telephone station 200 and controller 100. Advantageously, resistive connections are made to wire-pair 20 to enable DC signaling in both directions between the controller and the telephone station. Resistors 523 and 524 of the telephone station are substantially equal in magnitude and thus split the return current equally between conductors of wire-pair 20 as it returns to controller 100. Further, resistors 513 and 514 at the controller are selected to be substantially equal in magnitude so as to maintain balance in current flow. Such balance is important because variations in the return current would otherwise show up as voltage variations across terminals 106, 108 and 206, 208.

Circuitry for transmitting and receiving DC signals is shown to be identical at the controller and at the telephone station in the example embodiment of FIG. 1. The DC signal transmitter comprises a balanced drive circuit operating in a manner similar to a "push-pull" amplifier. A binary signal, having voltages of 0 and +5 volts, is presented to differential amplifiers 511 and 516 which apply oppositely going pulses to wire-pair 20. When the DC signal present on terminal 105 is greater than +2.5 volts, amplifier 511 provides a "ONE" voltage through resistor 512 to terminal 106 of wire-pair 20, and differential amplifier 516 provides a "ZERO" voltage through resistor 515 to terminal 108 of wire-pair 20. When the DC signal present on terminal 105 is less than +2.5 volts, the situation is reversed and amplifier 511 provides the ZERO voltage while amplifier 516 provides the ONE voltage to terminals 106, 108, respectively, of wire-pair 20. In this embodiment, resistor 512 is substantially equal to resistor 515 and balanced DC signaling takes place.

Signals transmitted over wire-pair 20 from controller 100 to telephone station 200 are received by DC receiver 420. The output of DC receiver 420 is a binary signal on terminal 204. One state of the binary signal is present when the voltage on terminal 206 is somewhat more positive than the voltage on terminal 208. The other state of the binary signal is present when the voltage on terminal 208 is somewhat more positive than the voltage on terminal 206. DC receiver 420 is a differential comparator circuit. Since the DC signal transmitter at telephone station 200 functions identically to the DC signal transmitter at controller 100, its operation is identical and need not be described. Further, since DC receiver 410 at controller 100 is substantially identical to DC receiver 420 at telephone station 200, its operation is identical and need not be described. However, it is noted that the telephone station common reference on terminal 207 is not at the same absolute voltage level as the controller common reference on terminal 107. This is so because the return current causes a net voltage difference. Accordingly, the average input voltage to DC receiver 420 is slightly negative while the average input voltage to DC Receiver 410 is slightly positive and the input bias circuit of each of the receivers is different.

Figure 3:
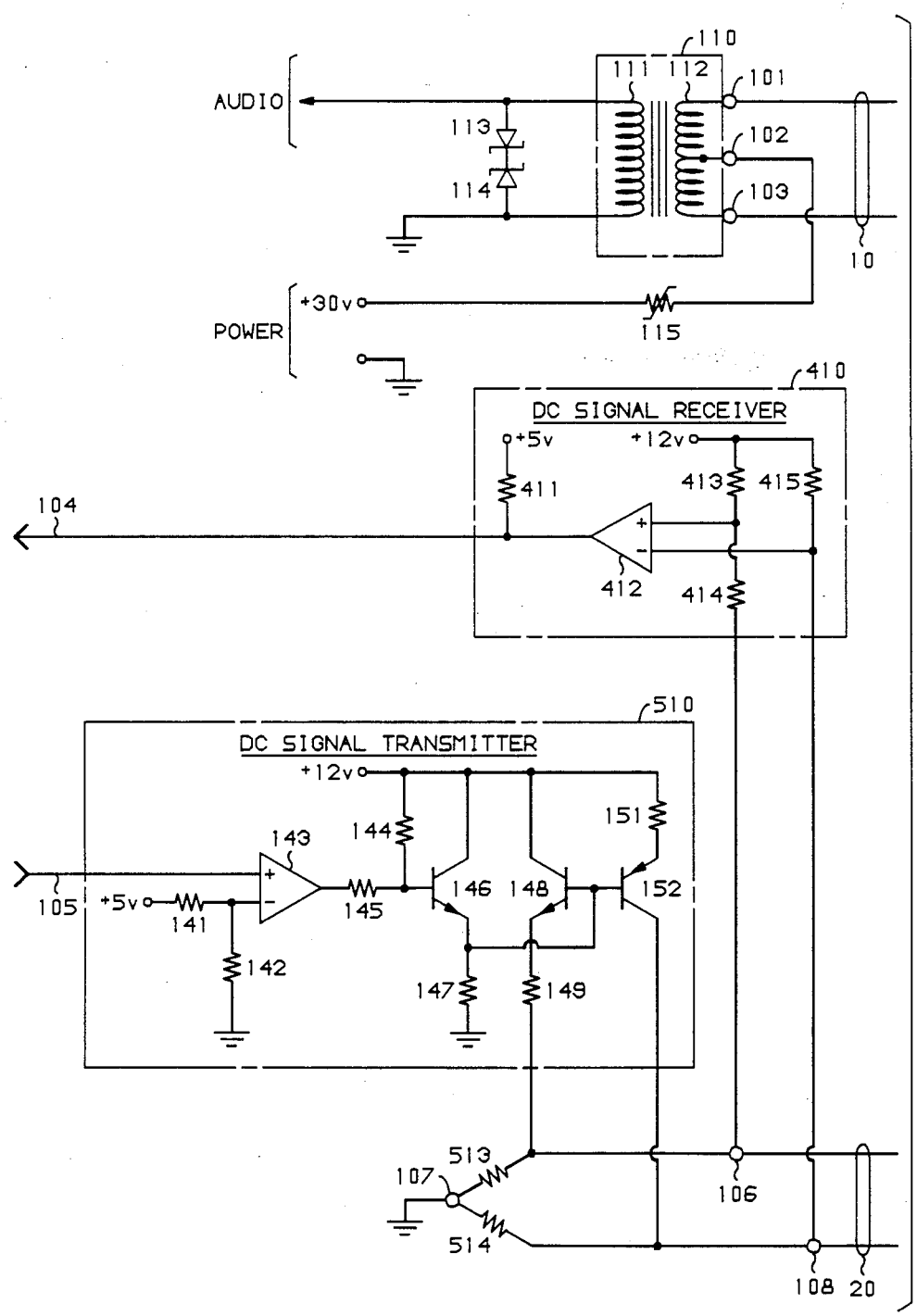
FIG. 3 is a detailed schematic of the Battery Feed Circuit for a Telephone System as implemented in a controller.
Figure 4:
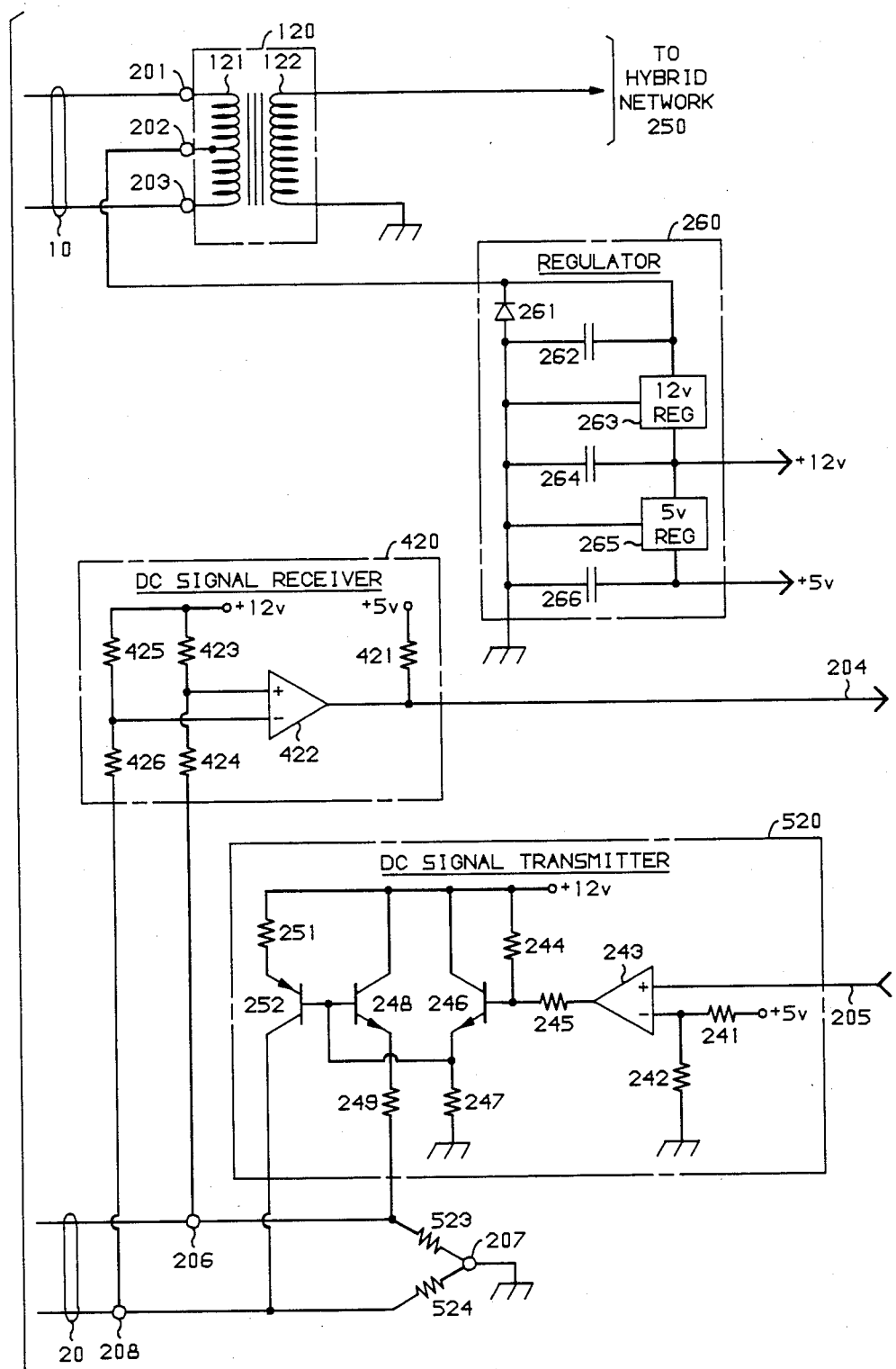
FIG. 4 is a detailed schematic of the Battery Feed Circuit for a Telephone System as implemented in a telephone station.

FIG. 3 provides a more detailed schematic of circuitry within controller 100 that directly interconnects with wire-pairs 10 and 20. Signals in the audio frequency band are connected to transformer 110 which is bifilar wound to achieve a high degree of balance. Zener diodes 113, 114 have a reverse breakdown voltage of 3.9 volts and operate to limit the excursions of AC signals present at transformer primary winding 111. These diodes are provided to protect the internal circuitry from disturbances (e.g., static) on the line. Transformer secondary winding 112 interconnects to wire-pair 10 at terminals 101, 103. Center tap 102 is interconnected with a source of DC voltage, here shown to be +30 volts with respect to the controller common reference, which supplies power to telephone station 200. Protection device 115 operates to limit the amount of DC current allowed to flow over wire-pair 10. Its resistance increases non-linearly; but, unlike a fuse, it does not break down completely when a predetermined threshold is exceeded. One suitable component is the Raychem 21083 PTC device. FIG. 4 is now referred to to complete the description of circuitry associated with wire-pair 10. DC current flowing into terminals 201, 203 enters secondary winding 121 of transformer 120. This transformer is also a bifilar wound audio transformer suitable for transferring audio frequency signals across its windings. DC current entering terminals 201, 203 exits secondary winding 121 on center tap 202 where it is filtered and regulated for use within the telephone station. Diode 261 protects regulator 260 from voltages of incorrect polarity. Regulator 263 is responsive to input voltages greater than +12 volts present across capacitor 262 for delivering a regulated +12 volt output voltage across capacitor 264. One suitable device is the LM 317 voltage regulator. Regulator 265 is shown connected to the output of the +12 volt regulator and operates to provide a regulated output voltage of +5 volts across capacitor 266. One suitable device is the LM 78L05 voltage regulator. These voltages are used for powering circuitry within telephone station 200.

Returning to FIG. 3, the operation of the DC signal transmitter and receiver over wire-pair 20 is now described in greater detail, Data signaling is implemented as a half duplex balanced link with the data coupled onto both of the two conductors of wire-pair 20. DC signal transmitter 510 responds to binary input voltages on terminal 105 to provide a balanced signal onto wire-pair 20. Resistors 141, 142 set a threshold voltage of +2.5 volts for differential comparator 143. In general, the current drawn by the transmitter is nearly constant with the majority of the current traveling through either resistor 149 or resistor 151 depending on whether a ONE or ZERO is being transmitted. When the voltage on terminal 105 exceeds the threshold voltage, the output of comparator 143 is such as to cause little or no current flow through resistor 145. The output circuit of differential comparator 143 is an open collector terminal of a transistor whose emitter terminal is connected to the controller common reference. Consequently, current flow through resistor 144 and into the base of transistor 146 to control transistors 148 and 152. One conductor of wire-pair 20 is driven by a voltage source (emitter follower) comprising transistor 148 and a voltage divider comprising resistor 149 (approximately 800 ohms) and resistor 513 (approximately 20 ohms). The Thevenin equivalent circuit at terminal 106 comprises an output impedance of approximately 20 ohms and a voltage source that varies from 50–300 mV. A non-zero ZERO voltage was chosen for the controller in order to keep transistor 148 in the active region when a large return current flows through resistor 513. Resistors 144 and 145 are used as a voltage divider at the output of comparator 143 when comparator 143 is in the low state. The main consideration in the voltage divider is to keep the emitter of transistor 148 above the voltage produced across resistor 513 by the DC return current from telephone station 200.

The other conductor of wire-pair 20 is terminated by resistor 514 (approximately 20 ohms) and driven by a current source comprising transistor 152 and resistor 151 (approximately 800 ohms). Again, the Thevenin equivalent circuit at terminal 108 comprises an output impedance of approximately 20 ohms and a voltage source that varies from 50–300 mV. It is noted that the voltage swing and output impedance of each source are substantially the same. The result is that the conductors of wire-pair 20 are driven by two identical drivers of opposite polarity. The DC current increases in one conductor corresponds in magnitude to the DC current decrease in the other conductor. Such a technique tends to maintain a constant net DC current flow between the controller and the telephone station. This is important because although the audio link on wire-pair 10 is well balanced, there can be a small resistance mismatch which causes more current to travel down one conductor of wire-pair 10 than the other. DC current fluctuations, having frequency components in the audio band, are perceived as noise. Such noise is practically impossible to eliminate.

Referring to FIG. 3, the operation of DC signal receiver 410 is now discussed. During the receive mode, DC signal transmitter 510 is set in the transmit ZERO state. In the ideal ase (tolerance of cable conductors and return resistors 513, 514 ignored) the absolute voltage on terminals 106, 108 is a function of the return current; however, the differential voltage between terminals 106, 108 is totally independent of the return current. furthermore, the differential voltage (for a transmitted ONE) is a function of loop length. The voltage thresholds selected for DC signal receiver 410 are set with this strategy in mind. Bias resistors 413–415 interconnect with differential comparator 412 and set a receive threshold chosen to lie between the voltages received when a ZERO is transmitted on a short loop and a ONE is transmitted on a long loop. The output of differential comparator 412 is an open collector which interconnects with resistor 411 to provide a DC signal output on terminal 104. A device such as the LM339 is suitable for use in comparator 412. DC signal transmitter 520 (shown in FIG. 4) is identical to DC signal transmitter 510 (shown in FIG. 3). However, DC signal receiver 420 (shown in FIG. 4) differs from its counterpart in FIG. 3 in that bias resistor 423-426 are selected to operate with input voltages on terminals 206, 208 that are slightly negative with respect to the common reference on terminal 207.

It is noted that various modifications including, but not limited to, the interchange of the common reference and the DC voltage supply, and equivalent terminating/driving circuits for DC signal transmission, are possible within the spirit and scope of the present invention.

What is claimed is:

1. A battery feed circuit including a first wire-pair interconnecting a controller and a telephone station, the controller and the telephone station each having a transformer with at least a primary and a secondary winding, said first wire-pair being terminated in the secondary winding of the transformer at each end, each secondary winding having (i) a pair of terminals for connection to the first wire-pair, (ii) a center tap between the pair of terminals for connection to DC power supply circuitry, and (iii) DC continuity between said pair of terminals, a second wire-pair interconnecting the controller and the telephone station, said second wire-pair being terminated in a pair of substantially equal seriesconnected resistors at each end, each pair of seriesconnected resistors including a center tap for connection to DC power return circuitry and having DC continuity therebetween.

2. The battery feed circuit of claim 1 further including first and second signal drivers, each signal driver being connected to a different wire of the second wirepair, said first and second signal drivers being responsive to an input signal, common to each signal driver, for changing the magnitude of DC current flow in each of the wires of the second wire-pair by an equal and opposite amount.

3. The battery feed circuit of claim 2 wherein each signal driver has an associated Thevenin equivalent impedance equal to the other.

4. The battery feed circuit of claim 1 wherein the controller and the telephone station each include means for coupling audio signals to and from the first wire-pair through said transformer primary winding.

5. The battery feed circuit of claim 2 wherein the controller and the telephone station each include a DC signal receiver having input and output ports, each DC signal receiver being responsive to the differential voltage between wires of the second wire-pair at the input port, for providing a binary signal at the output port.

6. A controller for delivering power, voice, and digital data signals to a telephone station, said controller including a transformer having primary and secondary windings for coupling voice signals between the controller and a first wire-pair, the secondary winding including a pair of terminals connected to the first wire-pair and a center tap between said terminals for connection to a DC voltage source, a pair of series resistors interconnected between wires of a second wire-pair, said series resistors being substantially equal in magnitude and connected to a DC voltage return at the common connection between the series resistor pair; and a DC signal transmitter including first and second signal drivers, each signal driver being connected to a different wire of the second wire-pair, said first and second signal drivers being individually responsive to a binary data signal for changing the magnitude of DC current flow in each of the wires of the second wire-pair by an equal and opposite amount.

7. The controller of claim 6 further characterized by a DC signal receiver responsive to the differential voltage between wires of the second wire-pair for converting same into a binary data signal.

8. A telephone station for receiving power from and exchanging voice and data signals with a controller, the telephone station including a transformer having primary and secondary windings for coupling voice signals between the telephone station and a first wire-pair, the secondary winding including a pair of terminals connected to the first wire-pair and a center tap between said terminals for connection to a filter circuit for DC voltage,
- a pair of series resistors interconnected between wires of a second wire-pair, said series resistors being substantially equal in magnitude and connected to a DC voltage return at the common connection between the series resistor pair; and
- a DC signal transmitter including first and second signal drivers, each signal driver being connected to a different wire of the second wire-pair, said first and second signal drivers being individually responsive to a binary data signal for changing the magnitude of DC current flow in each of the wires of the second wire-pair by an equal and opposite amount.

9. The telephone station of claim 8 further characterized by a DC signal receiver responsive to the differential voltage between wires of the second wire-pair for converting same into a binary data signal at its output.

10. A battery feed circuit for a telephone system including a controller and at least one telephone station, said battery feed circuit comprising,
at the controller:
- a transformer having a primary winding for interconnection with a source of audio signals, and a secondary winding interconnected between wires of a first wire-pair, said secondary winding including a center tap connected to a source of DC voltage;
- a pair of series resistors interconnected between wires of a second wire-pair, said series resistors being substantially equal in magnitude and connected to controller ground at the common connection of the series resistor pair,
at the telephone station:
- a transformer having a primary winding for interconnection with a source of audio signals, and a secondary winding connected between wires of the first wire-pair, said secondary winding including a center tap connected to a filter circuit; and
- a pair of series resistors for interconnection between wires of the second wire-pair, said series resistors being substantially equal in magnitude and interconnected with telephone station ground at the common connection of the series resistor pair.

11. The battery feed circuit of claim 10 further comprising,
at the controller:
- a DC signal transmitter including first and second signal drivers, each signal driver being connected to a different wire of the second wire-pair, said first and second signal drivers being individually responsive to a first binary data signal for changing the DC current flow in each of the wires of the second wire-pair by equal and opposite amounts; and
at the telephone station:
- a DC signal receiver responsive to the differential voltage between wires of the second wire-pair for converting same into a binary data signal at its output substantially corresponding to the first binary data signal.

12. The battery feed circuit of claim 10 further comprising,
at the telephone station:
- a DC signal transmitter including first and second signal drivers, each signal driver being connected to a different wire of the second wire-pair, said first and second signal drivers being jointly responsive to a second binary data signal for changing the DC current flow in each of the wires of the second wire-pair by equal and opposite amounts; and
at the controller:
- a DC signal receiver responsive to the differential voltage between wires of the second wire-pair for converting same into a binary data signal at its output substantially corresponding to the second binary data signal.

13. The battery feed circuit of claim 11 further comprising,
at the telephone station:
- a DC signal transmitter including first and second signal driver, each signal driver being connected to a different wire of the second wire-pair, said first and second signal drivers being jointly responsive to a second binary data signal for changing the DC current flow in each of the wires of the second wire-pair by equal and opposite amounts; and
at the controller:
- a DC signal receiver responsive to the differential voltage between wires of the second wire-pair for converting same into a binary data signal at its output substantially corresponding to the second binary data signal.

* * * * *